United States Patent [19]

Snow et al.

[11] 4,229,915
[45] Oct. 28, 1980

[54] CORNER BRACKET WITH SADDLE FOR HIP RAFTERS OF BUILDINGS

[76] Inventors: Kenneth T. Snow, P.O. Box 175, Gilberts, Ill. 60136; Kenneth T. Snow, Jr., 837 Price Charles La., Schaumburg, Ill. 60195

[21] Appl. No.: 33,816

[22] Filed: Apr. 27, 1979

[51] Int. Cl.³ .............................................. E04B 1/60
[52] U.S. Cl. ...................................... 52/92; 403/219; 403/403; 403/406
[58] Field of Search ................. 52/92, 90, 93, 281, 52/289, 696; 403/188, 189, 219, 403, 406, 231, 217

[56] References Cited

U.S. PATENT DOCUMENTS

| | | | |
|---|---|---|---|
| 230,438 | 7/1880 | Porter | 403/231 |
| 1,141,210 | 6/1915 | Pirson | 403/231 |
| 1,380,518 | 6/1921 | Bellig | 403/219 |
| 1,559,582 | 11/1925 | Nelessen | 52/289 X |
| 1,820,205 | 8/1931 | Wilson | 403/231 |
| 1,988,388 | 1/1935 | Mioton | 52/92 |
| 2,768,434 | 10/1956 | Taylor | 403/217 |
| 3,925,954 | 12/1975 | Snow et al. | 403/188 |
| 3,967,908 | 7/1976 | Snow et al. | 403/219 |

FOREIGN PATENT DOCUMENTS 339146 2/1936 Italy ........................................ 403/217

*Primary Examiner*—J. Karl Bell
*Attorney, Agent, or Firm*—Kenneth T. Snow

[57] ABSTRACT

A corner bracket for the purpose of joining building walls of wood construction at right angles to one another and having a saddle to receive and effect a joining of an upwardly inclined roof hip rafter at 45° relative to the walls.

3 Claims, 3 Drawing Figures

CORNER BRACKET WITH SADDLE FOR HIP RAFTERS OF BUILDINGS

BACKGROUND OF THE INVENTION

1. Field of the Invention

The corner bracket of this invention provides for the secure locking of fabricated wall sections of a building together in a right-angle relationship and at the same time provides a fixed saddle for a roof hip rafter disposed at 45° relative to the right-angle corner formed by the adjoining building walls. The bracket prevents separation of the adjoining walls and roof. The bracket construction coupled with its nailing into the wood members comprising the walls and the roof hip rafter secure these components in both compression and extension directions. Buildings using this particular bracket resist destruction by wind or snow loads.

2. Description of the Prior Art

It is apparent that our own prior U.S. Pat. No. 3,925,954 is the most pertinent reference. Our prior patent discloses a weld fabricated bracket having attributes very similar to those of the present bracket. However, the present bracket differs from our previous bracket in that it is formed from one piece of metal, preferably steel, without any welding or other fastenings. Our earlier bracket was located generally as a bridge across the tops of the two-wall members. The saddle for the hip rafter in this earlier device was located entirely within a space inwardly of the wall sections whereas the newly invented bracket carries the saddle for the hip rafter directly over the adjoining top plates of the wall sections.

The following are brief descriptions of other patents of interest.

United States patent to Bellig U.S. Pat. No. 1,380,518 shows an interior mounted corner brace for an article of furniture.

The United States patent to Taylor U.S. Pat. No. 2,768,434 shows a prefabricated truss comprising a plurality of timbers joined together as a laminate and adapted to support the roof of a building.

The United States patent to Pirson U.S. Pat. No. 1,141,210 shows and describes an angle brace for a wooden frame primarily for window or door screens. The construction of the Pirson brace is to prevent separation of wood frame members joined at a right angle.

The United States patent to Miotan U.S. Pat. No. 1,988,388 shows and describes an all steel building construction with variously shaped structural pieces which are arranged for bolting together.

The United States patent to Nelessen U.S. Pat. No. 1,559,582 discloses a joist supporting bracket.

The very early United States patent to Porter U.S. Pat. No. 230,438 is an ornamental corner bracket for a screen frame very similar to the Pirson patent discussed above.

The Italian patent to Barbieri U.S. Pat. No. 339,146 dated Feb. 15, 1936 shows a variety of shapes of framing anchors for buildings.

Although there is much prior art in this field applicants' novel corner bracket with hip saddle appears to distinguish from everything previously disclosed in the prior art.

SUMMARY OF THE INVENTION

A principal object of the present invention is to provide a novel corner bracket with hip saddle adapted to securely hold building wall sections at right angles to one another and provide directly thereover a saddle to receive a hip rafter disposed at 45° relative to the corner between the adjacent wall sections.

An important object of this invention is to provide a novel means for constructing a one piece combination bracket for joining the walls and hip roof of a building together.

Another important object of this invention is to provide a novel bracket for building construction in which a single piece of metal has portions thereof struck downwardly and arranged and constructed to hold building walls at right angles to one another and other portions thereof struck upwardly to hold a hip rafter to the building walls.

Other and further important objects and advantages will become apparent from the disclosures in the following specification and accompanying drawings.

IN THE DRAWINGS

AS SHOWN IN THE DRAWINGS

Figure 1:
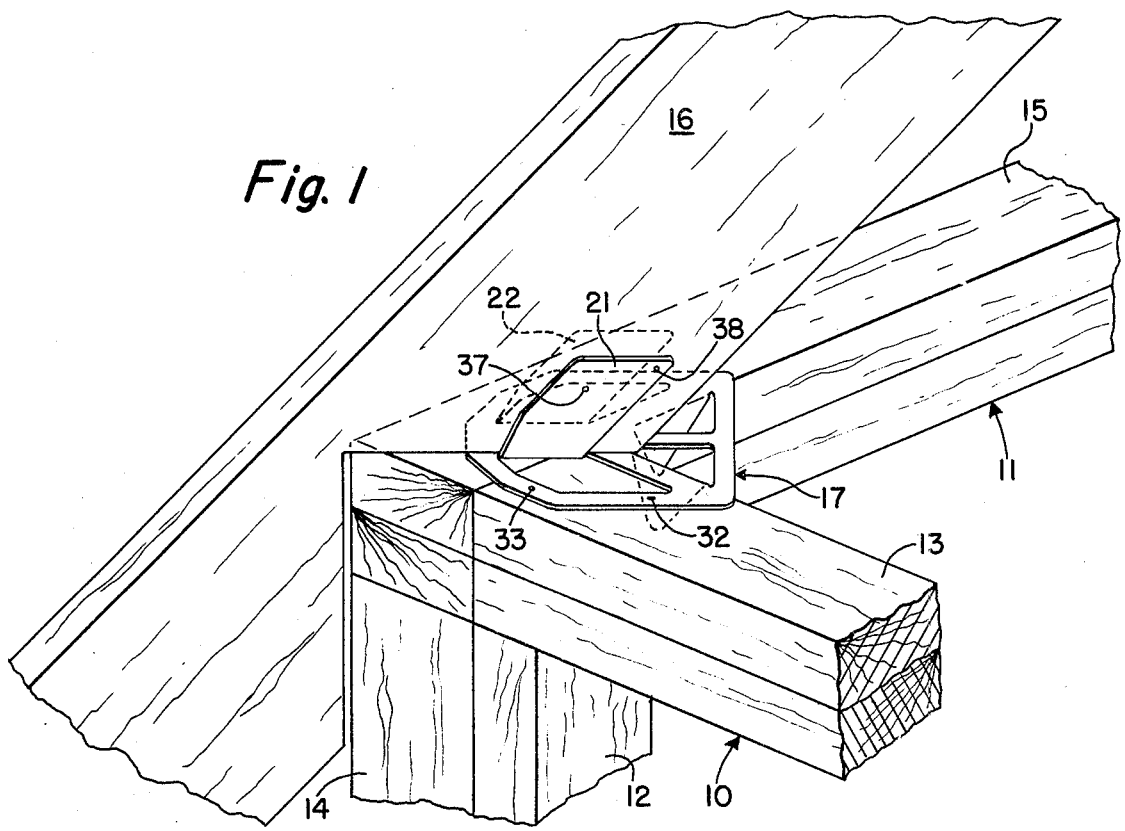
FIG. 1 is a perspective view of a portion of the wood framing of a building and particularly showing adjoining wall sections at right angles and including a hip rafter for a roof and including the one piece die formed bracket of this invention locking those wood framing elements together.

The reference numeral 10 indicates generally a first wood fabricated wall. A second wood fabricated wall 11 is disposed at right angles to the first wall 10. The first fabricated wall 10 includes vertical wood studs 12 which are joined at their upper ends with a double top plate 13. In order to make the drawing to as large a scale as possible only one vertical stud 12 has been shown but it should be understood the wall 10 would include a plurality of spaced apart studs. Similarly the second wall 11 includes vertical wood studs 14 and again only one such stud 14 has been shown. The studs 14 have their upper ends joined together with a double top plate 15. The first and second walls 10 and 11 depict a right angle corner for a building.

A roof hip rafter 16 preferably bisects the right angle corner formed between the adjacent wall sections 10 and 11. The hip rafter 16 is disposed at a 45° angle with respect to the corner between the walls 10 and 11. The hip rafter 16 is inclined upwardly and inwardly for adjoining with a ridge board (not shown) at the top of the building's hip roof.

The one piece die formed corner bracket of this invention is designated generally by the numeral 17. The corner bracket 17 is provided with a horizontal plate 18. One portion of the plate 18 lies directly over the corner formed by the adjoining walls and another portion thereof lies inwardly of the corner. A first triangularly shaped tab 19 is struck downwardly from that portion of the horizontal plate 18 lying inwardly of the corner. A second downwardly struck triangularly shaped tab 20 also depends from the portion of the horizontal plate 18 lying inwardly of the corner. The first and second triangularly shaped downwardly struck tabs 19 and 20 are disposed at right angles to one another and are adapted to abut the inner faces of the top plates 13 and 15 respectively.

This same horizontal plate 18 has a first tab 21 struck upwardly from that portion lying directly over the corner. A second spaced apart tab 22 is also struck upwardly from the portion lying directly over the corner. The tabs 21 and 22 are disposed parallel to one another and together with the horizontal plate 18 define a saddle for the hip rafter 16. The shape of the tabs 21 and 22 is such that although the lower portions are located directly over the top surfaces of the adjoining wall top plates 13 and 15, their upper portions extend slightly inwardly into the space between the inner walls of the top plates 13 and 15.

Figure 3:
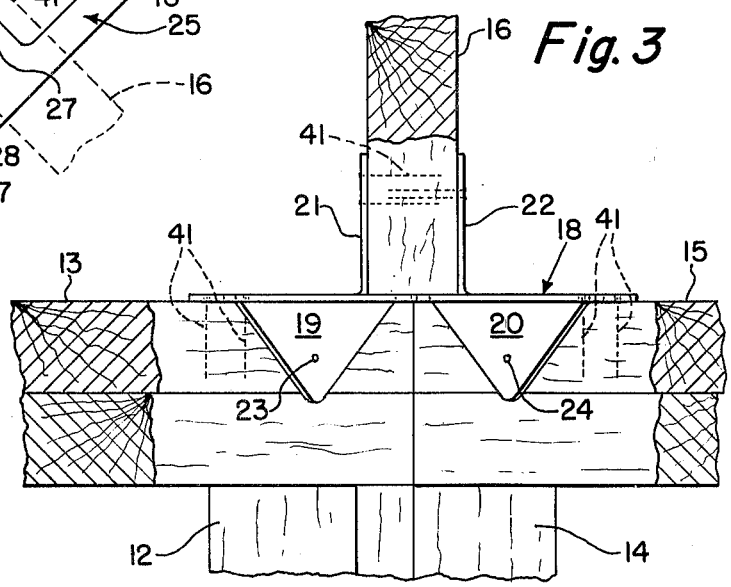
FIG. 3 is an elevational view detail of the device as viewed from the interior of the joint.

In using the corner bracket of this invention in building, the bracket 17 is applied to the wall sections prior to the application of a roof to the building. The wall sections 10 and 11 may be prefabricated wall sections or may be wall sections that are built on the job site. The corner bracket 17 is placed over the adjoining top plates 13 and 15 so that the horizontal plate portion 18 lies primarily on the top plates 13 and 15. The triangularly shaped downwardly struck tabs 19 and 20 are disposed flush with the inner faces of the top plates 13 and 15 respectively. As shown in FIG. 3 a nail hole 23 is provided in the downwardly struck triangularly shaped tab 19 and thus a nail may be inserted into the top plate 13 to securely hold the bracket 17 to the wall 10. A nail hole 24 is similarly provided in the second triangularly shaped downwardly struck tab 20 and provides for the nailing thereof to the top plate 15 through its inner face.

Figure 2:
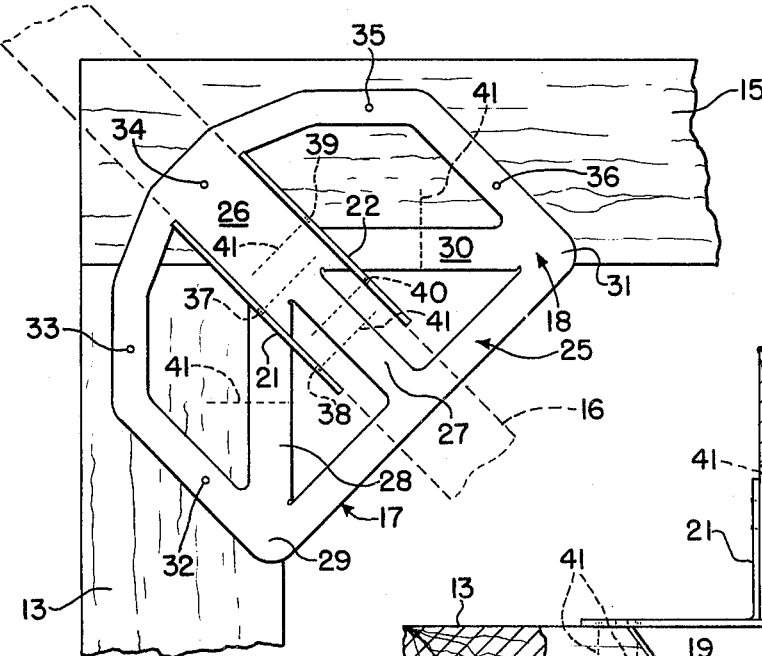
FIG. 2 is a top plan view of the assembly of FIG. 1.

With both the downwardly extending tabs 19 and 20 and the upwardly extending tabs 21 and 22 struck from the horizontal plate it leaves just a perimeter rim 25 which forms the outline of the bracket 17 of this invention. That portion of the horizontal plate 18 lying between the upwardly projecting tabs 21 and 22 is identified as a central base 26. This central base 26 is adapted to receive the bottom surface of the hip rafter 16. A relatively narrow strap member 27 lies in straight line relationship with the central base portion 26 of the bracket and extends inwardly of the building joint to the perimeter rim 25 as best shown in FIG. 2. A narrow strap 28 is angularly disposed relative to the central base 26 and joins that base 26 with a first front corner 29 of the perimeter rim 25 of the horizontal plate 18. Similarly a diverging narrow strap member 30 is disposed angularly relative to the central base 26 and joins that base to a second spaced apart front corner 31 of the perimeter rim 25. The horizontal plate 18 includes the perimeter rim 25, the central base portion 26 to receive the bottom of the hip rafter 16, and three supporting tie straps 27, 28 and 30. The plate 18 is provided with spaced apart nail holes 32, 33, 34, 35 and 36. All of these nail holes are used to securely fasten the corner bracket to the top surfaces of the adjoining top plates 13 and 15. The upwardly struck tab 21 is provided with spaced apart nail holes 37 and 38 so that the included hip rafter 16 in the joint may be fastened to the bracket by means of nails passing through these openings 37 and 38. Similarly, spaced apart nail holes 39 and 40 are provided in the upwardly struck tab 22. It is important that the nail holes 39 and 40 be offset from the nail holes 37 and 38 in the tab 21 so that the nails coming from opposite sides into the hip rafter 16 will not strike one another but rather will securely grip and hold the roof rafter to the wall sections. For convenience all of the nails are indicated by the numeral 41 and are shown as dash lines penetrating the nail holes as above described. Each nail entering through the metal portion of the bracket enters the wood members which are included in the joint. This includes the top plates of the right angle adjoining wall sections 10 and 11 and the included hip rafter 16. By reason of certain of the nails 41 being disposed at 90° relative to one another, that is, horizontally into the sides of the top plate members through the nail holes 23 and 24 in the downwardly struck tabs 19 and 20, and vertically into the tops of the top plate members through the plurality of nail holes 32, 33, 34, 35 and 36 in the horizontal plate 18, the adjoining wall members 10 and 11 are securely held against a separation in any direction.

OPERATION OF THE DEVICE

The horizontal plate 18 of the bracket 17 is mounted over and directly on top of the corner of the adjoining wooden wall sections 10 and 11. The bracket is then secured to the corner of the wall sections by reason of nailing into the downwardly depending triangularly shaped tabs 19 and 20 and through the top surface of the plate 18. This holds those wall sections 10 and 11 from any tendency to separate due to unusual loading in any direction. Once the bracket is set over the top of the adjoining top plates there is automatically provided a saddle formed by the upwardly struck parallel tabs 21 and 22 and the included central base 26. The hip rafter 16 rests directly on the base portion 26 of the bracket which in turn lies directly over the joint and not inwardly or outwardly of the joint. It is this position directly over the top of the top plates that gives added rigidity to the joint formed by the corner bracket of this invention. At this point nails 41 are inserted through the holes 37, 38, 39 and 40 and driven into the wooden hip rafter which has been placed in the saddle. The hip rafter 16 is automatically positioned at 45° relative to the right angle corner between the wall sections 10 and 11 and after nailing, the hip roof becomes integral with the wall sections. The walls and roof will resist separation no matter how severe the loading on those components may be. The fact that the saddle for the hip rafter is positioned directly over the top corner of the adjoining wall sections eliminates any lever arm effect which could have occurred if the saddle was located inwardly of the corner.

We are aware that numerous details of construction of the corner bracket of this invention may be changed and it is not our intention to limit the patent granted hereon otherwise than as necessitated by the appended claims.

What is claimed is:

1. A building corner bracket with an integral hip saddle for wood framed buildings of the type having walls disposed at right angles to one another and forming a corner, and each wall having a top plate, said bracket comprising a horizontal plate having a portion thereof disposed over the tops of the top plates of the adjoining walls and another portion thereof extending inwardly of the corner, a first tab struck downwardly from the horizontal portion extending inwardly of the corner and adapted to abut against the inner wall of one of the wooden top plates, a second downwardly struck tab from the horizontal portion extending inwardly of the corner and disposed at right angles with respect to the first tab and adapted to abut against the inner wall of the adjoining wooden top plate, a first tab struck upwardly from the horizontal portion disposed over the tops of the top plates of the adjoining walls and a second tab struck upwardly from the horizontal portion disposed over the tops of the top plates of the adjoining walls and spaced apart from the first upwardly struck tab and lying parallel thereto, said upwardly struck tabs defining with a section of the horizontal portion between the tabs, a saddle for a hip rafter, said horizontal plate, the downwardly struck tabs and the upwardly struck tabs having nail holes for inserting nails therein to securely hold the bracket to the adjoining wooden walls and the included roof hip rafter.

2. A building corner bracket as defined in claim 1 in which the upwardly struck tabs have portions extending inwardly of the corner formed by the adjoining walls.

3. A building corner bracket defined in claim 1 in which the horizontal plate has a relatively narrow perimeter edge outlining the downwardly struck tabs and the upwardly struck tabs and including narrow strips radiating from the section between the upwardly struck tabs to the perimeter edge.

* * * * *